(12) United States Patent
Yamamoto et al.

(10) Patent No.: US 11,912,908 B2
(45) Date of Patent: Feb. 27, 2024

(54) AIR-PERMEABLE ADHESIVE SHEET AND BREATHABLE PRODUCT

(71) Applicant: NITTO DENKO CORPORATION, Osaka (JP)

(72) Inventors: Hajime Yamamoto, Osaka (JP); Hiroki Kigami, Osaka (JP); Marie Aizuka, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 452 days.

(21) Appl. No.: 17/417,232

(22) PCT Filed: Dec. 23, 2019

(86) PCT No.: PCT/JP2019/050443
§ 371 (c)(1),
(2) Date: Jun. 22, 2021

(87) PCT Pub. No.: WO2020/138008
PCT Pub. Date: Jul. 2, 2020

(65) Prior Publication Data
US 2022/0056310 A1  Feb. 24, 2022

(30) Foreign Application Priority Data

Dec. 28, 2018  (JP) ................. 2018-248630

(51) Int. Cl.
*C09J 7/10* (2018.01)
*C09J 7/24* (2018.01)
*C09J 7/25* (2018.01)

(52) U.S. Cl.
CPC . *C09J 7/10* (2018.01); *C09J 7/24* (2018.01); *C09J 7/25* (2018.01)

(58) Field of Classification Search
CPC ......... C09J 7/10; C09J 7/24; C09J 7/25; C09J 7/20; C09J 2203/326; C09J 2301/124;
(Continued)

(56) References Cited

U.S. PATENT DOCUMENTS 3,085,024 A * 4/1963 Blackford ........... A61F 13/0269
206/820
7,413,787 B2 * 8/2008 Vetrovec ..................... C09J 7/22
428/137
(Continued)

FOREIGN PATENT DOCUMENTS

JP  2003-313516  11/2003
JP  2005-105212  4/2005
(Continued)

OTHER PUBLICATIONS

International Search Report issued in PCT/JP2019/050443, dated Mar. 3, 2020 and English translation thereof.
(Continued)

*Primary Examiner* — Patricia L. Nordmeyer
(74) *Attorney, Agent, or Firm* — GREENBLUM & BERNSTEIN, P.L.C.

(57) ABSTRACT

An air-permeable adhesive sheet has air permeability in a thickness direction thereof and including an adhesive agent layer having first through holes extending in the thickness direction, wherein at least one surface of the adhesive agent layer forms an adhesive surface, the through holes have an average opening diameter of 1.0 to 50 μm and an average interval of 5 to 400 μm, and a variation in air permeability in the thickness direction is 22% or less as represented by a coefficient of variation of an air permeability measured according to Method B for air permeability measurement (Gurley method) specified in JIS L 1096: 2010, with an effective measurement area as a predetermined value selected from 0.5 to 2.0 mm². The air-permeable adhesive (Continued)

sheet is a sheet capable of obtaining good characteristics such as air permeability even when being made into a sheet having a small area.

13 Claims, 12 Drawing Sheets

(58) Field of Classification Search
CPC ............... C09J 2301/18; C09J 2433/00; C09J 2467/006; C09J 2479/086; C09J 7/38; C09J 133/00; C09J 183/04; B32B 2250/24; B32B 3/26; B32B 3/266; B32B 7/06; B32B 15/085; B32B 15/20; B32B 27/065; B32B 27/10; B32B 2264/0257; B32B 2307/724; B32B 15/18; B32B 27/12; B32B 27/281; B32B 27/40; B32B 2250/26; B32B 5/022; B32B 2250/02; B32B 2307/732; B32B 2457/00; B32B 5/024; B32B 5/18; B32B 15/09; B32B 15/12; B32B 27/08; B32B 27/283; B32B 27/308; B32B 27/32; B32B 27/322; B32B 27/36; B32B 29/005; B32B 2307/748
See application file for complete search history.

(56) References Cited

U.S. PATENT DOCUMENTS

| 8,101,884 B2 * | 1/2012 | Kato .......................... C09J 7/20 |
| | | 156/272.8 |
| 2005/0074606 A1 | 4/2005 | Nishiyama et al. |
| 2008/0090049 A1 * | 4/2008 | Kato .......................... C09J 7/22 |
| | | 428/131 |

FOREIGN PATENT DOCUMENTS

| JP | 2005-266004 | 9/2005 |
| JP | 2009-62486 | 3/2009 |
| JP | 2011-21094 | 2/2011 |
| WO | 2005/121268 | 12/2005 |

OTHER PUBLICATIONS

Written Opinion issued in PCT/JP2019/050443, dated Mar. 3, 2020 and English translation thereof.

* cited by examiner

Example 1

Example 2

Comparative Example 1

Comparative Example 2

Example 5

AIR-PERMEABLE ADHESIVE SHEET AND BREATHABLE PRODUCT

TECHNICAL FIELD

The present invention relates to an air-permeable adhesive sheet having air permeability in a thickness direction thereof, and a breathable product including the air-permeable adhesive sheet.

BACKGROUND ART

Providing a ventilation port in a housing of an electronic device or the like is widely practiced to ensure ventilation between the inside and the outside of the housing and to mitigate a change in the pressure inside the housing due to a temperature change. In addition, in the case where the ventilation port is provided, an air-permeable membrane for covering the ventilation port is often disposed on the surface of the housing, for example, for the purpose of preventing entry of foreign substances such as water and dust into the housing. The air-permeable membrane is a membrane having air permeability in a membrane thickness direction thereof. FIG. 16 shows an example of a housing (ventilation housing) that is provided with a ventilation port and has an air-permeable membrane disposed on the surface thereof so as to cover the ventilation port. A housing 101 shown in FIG. 16 has a ventilation port 103 that connects the inside and the outside of the housing 101. An air-permeable membrane 105 for covering the ventilation port 103 is disposed on a surface 102 of the housing 101. The air-permeable membrane 105 is joined to the surface 102 of the housing 101 by an adhesive agent layer 104 disposed on a peripheral portion of the membrane 105. In the housing 101, ventilation 106 is ensured through the ventilation port 103, an opening of the adhesive agent layer 104, and the air-permeable membrane 105. An example of the housing 101 having such a ventilation structure is disclosed in Patent Literature 1 (see FIG. 11).

CITATION LIST

Patent Literature

Patent Literature 1: JP 2005-266004 A

SUMMARY OF INVENTION

Technical Problem

The conventional adhesive agent layer does not have its own air permeability (air permeability in a thickness direction thereof). Therefore, in the housing 101 shown in FIG. 16, the ventilation 106 by the ventilation port 103 is ensured by disposing the adhesive agent layer 104 only on the peripheral portion of the air-permeable membrane 105. However, in recent years, adaptation to a smaller ventilation port has been required. According to a study by the present inventors, it has been found that there are cases where the conventional adhesive agent layer cannot be sufficiently adapted to a small ventilation port. Therefore, the present inventors have further studied the technology of causing the adhesive agent layer itself to have air permeability in the thickness direction thereof to make the adhesive agent layer into an air-permeable adhesive sheet. However, it has been found that, when the air-permeable adhesive sheet is made into a sheet having a small area, the desired characteristics such as air permeability tend not to be obtained.

The present invention aims to provide a novel air-permeable adhesive sheet that is an air-permeable adhesive sheet having air permeability in a thickness direction thereof and is capable of obtaining good characteristics such as air permeability even when being made into a sheet having a small area.

Solution to Problem

The present invention provides an air-permeable adhesive sheet having air permeability in a thickness direction thereof, the air-permeable adhesive sheet including:

an adhesive agent layer having first through holes extending in the thickness direction, wherein at least one surface of the adhesive agent layer forms an adhesive surface, the through holes have an average opening diameter of 1.0 to 50 µm, the through holes have an average interval of 5 to 400 µm, and a variation in air permeability in the thickness direction is 22% or less as represented by a coefficient of variation of an air permeability measured according to Method B for air permeability measurement (Gurley method) specified in Japanese Industrial Standards (hereinafter, referred to as "JIS") L 1096: 2010, with an effective measurement area as a predetermined value selected from 0.5 to 2.0 mm².

According to another aspect, the present invention provides a breathable product having a surface with an opening and having breathability through the opening in the surface, the breathable product further including:

an air-permeable adhesive sheet attached to the surface so as to cover the opening, wherein the air-permeable adhesive sheet is the air-permeable adhesive sheet of the present invention.

According to still another aspect, the present invention provides a breathable product including a porous substrate and an air-permeable adhesive sheet attached to a surface of the porous substrate, wherein the air-permeable adhesive sheet is the air-permeable adhesive sheet of the present invention.

Advantageous Effects of Invention

In the air-permeable adhesive sheet of the present invention, the average opening diameter and the average interval of the through holes which impart air permeability in the thickness direction to the sheet are small, so that the number of the through holes existing in a predetermined area can be increased. Therefore, even when the air-permeable adhesive sheet is made into a sheet having a small area, a sufficient number of through holes that contribute to air permeation can be ensured, and the reliability of the air permeation can be improved. In addition, in the air-permeable adhesive sheet of the present invention, the variation in the air permeability in the thickness direction in a small area is small, and, even when the air-permeable adhesive sheet is made into a sheet having a small area, the desired air permeability as an air-permeable adhesive sheet can be obtained more reliably. Furthermore, with the air-permeable adhesive sheet of the present invention, owing to the highly uniform sheet structure that can achieve air permeability in which the above variation is small, good characteristics can be expected for characteristics other than air permeability, for example, the adhesive strength of the adhesive surface.

DESCRIPTION OF EMBODIMENTS

Hereinafter, embodiments of the present invention will be described with reference to the drawings. The present invention is not limited to the embodiments described below.

[Air-Permeable Adhesive Sheet]

Embodiment 1

Figure 1A:
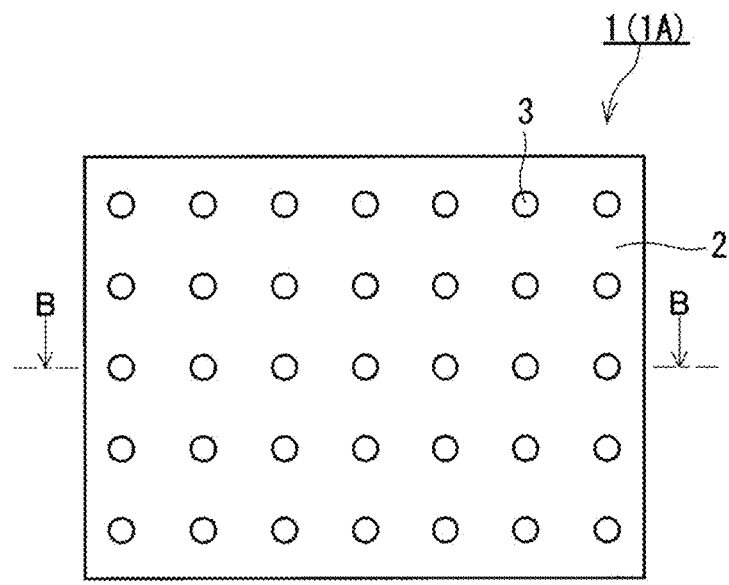
FIG. 1A is a plan view schematically showing an air-permeable adhesive sheet of Embodiment 1.
Figure 1B:
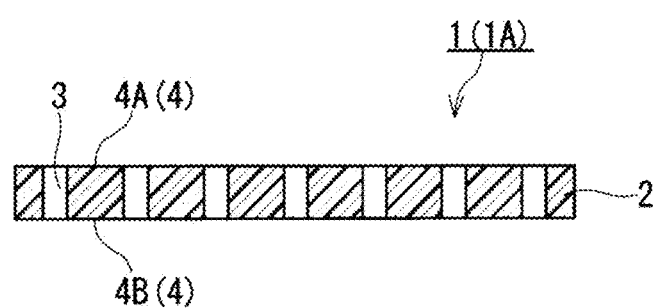
FIG. 1B is a cross-sectional view showing a cross-section B-B of the air-permeable adhesive sheet shown in FIG. 1A.

FIG. 1A and FIG. 1B show an air-permeable adhesive sheet of Embodiment 1. FIG. 1B shows a cross-section B-B of an air-permeable adhesive sheet 1 (1A) shown in FIG. 1A. The air-permeable adhesive sheet 1A is a single-layer adhesive sheet formed of an adhesive agent layer 2 having first through holes 3 extending in a thickness direction thereof. The air-permeable adhesive sheet 1A has air permeability in a thickness direction thereof due to the through holes 3. In addition, in the air-permeable adhesive sheet 1A, each of surfaces 4A and 4B of the adhesive agent layer 2 forms an adhesive surface 4. The air-permeable adhesive sheet 1A is a double-sided adhesive sheet unprovided with a substrate. The individual through holes 3 are normally independent of each other.

In the example of FIG. 1A and FIG. 1B, the direction in which the through holes 3 extend is a direction perpendicular to the adhesive surface 4 of the adhesive agent layer 2. However, the direction in which the through holes 3 extend is not limited as long as the through holes 3 extend in the thickness direction of the adhesive agent layer 2, in other words, connect the surface 4A and the other surface 4B of the adhesive agent layer, and the direction in which the through holes 3 extend may be inclined with respect to the direction perpendicular to the adhesive surface 4 of the adhesive agent layer 2.

In the example of FIG. 1A and FIG. 1B, the shapes of the openings of the through holes 3 are each a circle when viewed in the direction perpendicular to the adhesive surface 4. However, the shapes of the openings of the through holes 3 are not limited to this example, and may each be a polygon including a square and a rectangle, an ellipse, or an irregular shape when viewed in the direction perpendicular to the adhesive surface 4.

The average opening diameter of the through holes 3 is 1.0 to 50 µm. The upper limit of the average opening diameter of the through holes 3 may be 45 µm or less, 40 µm or less, or even 35 µm or less. The lower limit of the average opening diameter of the through holes 3 may be 5.0 µm or more or even 10 µm or more. In the present description, the average opening diameter of the through holes 3 means the average value of the diameters of the openings of at least three through holes 3 in the adhesive surface of the adhesive agent layer 2. When the opening of a through hole 3 is non-circular when viewed in the direction perpendicular to the adhesive surface, the diameter of this opening is the diameter of a virtual circle having the same area as the area of this opening. When each of the surfaces 4A and 4B of the adhesive agent layer 2 forms an adhesive surface and the average opening diameters of the through holes 3 in the respective adhesive surfaces are different from each other, a relatively large value can be regarded as the average opening diameter of the through holes 3.

The variation in the opening diameters of the through holes 3 is, for example, 9% or less, and may be 8% or less, 7% or less, 6% or less, or even 5% or less as represented by a coefficient of variation of the opening diameters. The lower limit of the variation in the opening diameters of the through holes 3 is, for example, 0.5% or more as represented by the coefficient of variation of the opening diameters. The coefficient of variation (CV) is a coefficient that serves as an index of the variation in a plurality of numerical values, and is a value obtained by dividing the standard deviation (a) of the numerical values by the average value (Av) of the numerical values. The coefficient of variation is defined as a value obtained from the standard deviation and the average value of at least three numerical values.

The average interval of the through holes 3 is 5 to 400 μm. The upper limit of the average interval of the through holes 3 may be 300 μm or less, 250 μm or less, 200 μm or less, 150 μm or less, or even 120 μm or less. The lower limit of the average interval of the through holes 3 may be 10 μm or more, 20 μm or more, or even 30 μm or more. In the present description, the average interval of the through holes 3 means the average value of the center-to-center distances of at least six through holes 3, and the center-to-center distance of a through hole 3 means the distance between the center of the opening of this through hole 3 in the adhesive surface 4 of the adhesive agent layer 2 and the center of the opening of another through hole 3 located closest to this through hole 3 on the adhesive surface 4. When the opening of a through hole 3 is non-circular when viewed in the direction perpendicular to the adhesive surface 4, the center of the opening can be the center of gravity of the opening when viewed in the above direction.

In the example shown in FIG. 1A and FIG. 1B, the through holes 3 are regularly arranged. More specifically, the through holes 3 in this example are regularly arranged such that the center of the opening of each through hole 3 is located at a position corresponding to an intersection (lattice point) of a square lattice when viewed in the direction perpendicular to the adhesive surface 4. However, the arrangement of the through holes 3 is not limited to this example, and the through holes 3 may be regularly arranged such that the center of the opening of each through hole 3 is located at a position corresponding to, for example, an intersection of one of various lattices such as a rectangular lattice, an oblique lattice, a rhombic lattice, a hexagonal lattice, and a parallelogrammic lattice when viewed in the direction perpendicular to the adhesive surface 4. The through holes 3 may be provided such that the center of the opening of each through hole 3 is at a random position when viewed in the direction perpendicular to the adhesive surface 4, but in order to suppress the variation in the air permeability in the thickness direction, the through holes 3 are preferably arranged regularly.

The variation in the air permeability in the thickness direction of the air-permeable adhesive sheet 1A, that is, the variation in the air permeability between one surface and the other surface of the air-permeable adhesive sheet 1A (in other words, between the surface 4A and the surface 4B of the adhesive agent layer 2) as represented by a coefficient of variation of an air permeability is 22% or less. Here, the air permeability is a value (Gurley air permeability) measured according to Method B for air permeability measurement (Gurley method) specified in JIS L 1096: 2010, with an effective measurement area as a predetermined value selected from 0.5 to 2.0 mm$^2$. The coefficient of variation of each characteristic exhibited by the air-permeable adhesive sheet can be obtained from the standard deviation and the average value of the values of each characteristic in at least measurement regions at three locations. The measurement regions may be set so as to partially overlap each other. It should be noted that the effective measurement areas of the measurement regions at the three locations are set so as to be all the same.

For example, measurement of a Gurley air permeability with an effective measurement area being set to 2.0 mm$^2$ can be performed by using a measurement jig provided with a through hole (cross-sectional area: 2.0 mm$^2$) having a circular cross section with a diameter of 1.6 mm. An example of the measurement jig is a polycarbonate disc provided with the through hole at the center thereof and having a thickness of 2 mm and a diameter of 47 mm. Measurement of a Gurley air permeability using the measurement jig can be specifically performed as follows.

An air-permeable adhesive sheet to be evaluated is fixed to one surface of the measurement jig so as to cover the opening of the through hole of the measurement jig. The fixation is performed such that, during measurement of a Gurley air permeability, air passes through only the opening of the through hole of the measurement jig and an effective test portion (portion overlapping the opening of the through hole of the measurement jig when viewed in a direction perpendicular to a main surface of the fixed air-permeable adhesive sheet) of the air-permeable adhesive sheet, and the fixed portion formed by the fixation does not hinder passing of air through the effective test portion of the air-permeable adhesive sheet. The adhesive surface 4 of the air-permeable adhesive sheet can be used for fixing the air-permeable adhesive sheet. Next, the measurement jig having the air-permeable adhesive sheet fixed thereto is set on a Gurley air permeability testing machine such that the surface on which the air-permeable adhesive sheet is fixed is at the downstream side of airflow during measurement, and a time ti taken for 100 mL of air to pass through the air-permeable adhesive sheet is measured. The measured time ti can be regarded as the Gurley air permeability with an effective measurement area being set to 2.0 mm$^2$. Measurement of a Gurley air permeability with an effective measurement area being set to another value can be performed by using the above measurement jig provided with a through hole having a cross-sectional area that is equal to the other value.

The variation in the air permeability in the thickness direction of the air-permeable adhesive sheet 1A may be 20% or less, 15% or less, 13% or less, 12% or less, or even 10% or less as represented by the coefficient of variation of the air permeability. The lower limit of the variation in the air permeability in the thickness direction of the air-permeable adhesive sheet 1A is, for example, 0.1% or more, and may be 1% or more as represented by the coefficient of variation of the air permeability.

The air permeability in the thickness direction of the air-permeable adhesive sheet 1A is, for example, 100 seconds/100 mL or less, and may be 80 seconds/100 mL or less, 60 seconds/100 mL or less, 50 seconds/100 mL or less, 40 seconds/100 mL or less, or even 30 seconds/100 mL or less depending on the configuration of the air-permeable adhesive sheet, as represented by the air permeability with an effective measurement area being set to 2.0 mm², that is, a Gurley air permeability measured according to Method B for air permeability measurement (Gurley method) specified in JIS L 1096: 2010 with an effective measurement area being set to 2.0 mm². The lower limit of the Gurley air permeability of the air-permeable adhesive sheet 1A is, for example, 1.0 second/100 mL or more.

Normally, the air-permeable adhesive sheet 1A does not have air permeability in an in-plane direction thereof.

The adhesive strength of the adhesive surface 4 of the air-permeable adhesive sheet 1A is, for example, 1.0 N/10 mm or more, and may be 2.0 N/10 mm or more, 4.0 N/10 mm or more, 5.0 N/10 mm or more, or even 7.0 N/10 mm or more depending on the configuration of the air-permeable adhesive sheet, as represented by a 180° peeling adhesive strength measured according to Testing Method 1 for adhesive strength specified in JIS Z0237: 2009. The upper limit of the adhesive strength of the adhesive surface 4 of the air-permeable adhesive sheet 1A is, for example, 30 N/10 mm or less as represented by the 180° peeling adhesive strength. In the case where the air-permeable adhesive sheet has two adhesive surfaces 4 as in the example shown in FIG. 1A and FIG. 1B, the adhesive strengths of the respective adhesive surfaces 4 may be substantially the same or may be different from each other. In the present description, if the difference in the 180° peeling adhesive strength is within 0.2 N/10 mm, the adhesive strengths are regarded as being substantially the same. In addition, in the case where the air-permeable adhesive sheet has two adhesive surfaces 4, at least one adhesive surface 4 may satisfy the above range of the adhesive strength, and, preferably, both adhesive surfaces 4 may satisfy the above range of the adhesive strength.

The variation in the adhesive strength of the adhesive surface 4 of the air-permeable adhesive sheet 1A is, for example, 12% or less, and may be 10% or less, 8.0% or less, 7.0% or less, or even 6.0% or less depending on the configuration of the air-permeable adhesive sheet, as represented by a coefficient of variation of the 180° peeling adhesive strength. The lower limit of the variation in the adhesive strength of the adhesive surface 4 of the air-permeable adhesive sheet 1A is, for example, 0.5% or more as represented by the coefficient of variation of the 180° peeling adhesive strength. In the case where the air-permeable adhesive sheet has two adhesive surfaces 4 as in the example shown in FIG. 1A and FIG. 1B, the variations in the adhesive strengths of the respective adhesive surfaces 4 may be substantially the same or may be different from each other. In the present description, if the difference in the coefficient of variation is within 1%, the variations in the adhesive strengths are regarded as being substantially the same. In addition, in the case where the air-permeable adhesive sheet has two adhesive surfaces 4, at least one adhesive surface 4 may satisfy the above variation in the adhesive strength, and, preferably, both adhesive surfaces 4 may satisfy the above variation in the adhesive strength.

The shape of the air-permeable adhesive sheet 1A is typically a polygon including a square and a rectangle, a circle, an ellipse, or a strip shape when viewed in the direction perpendicular to the adhesive surface 4. However, the shape of the air-permeable adhesive sheet 1A is not limited to these examples.

The air-permeable adhesive sheet 1A is suitable for use for an adherend having an attachment surface with a small area (surface to which the air-permeable adhesive sheet 1A is to be attached). The small-area adherend may be a micro electro mechanical system (hereinafter, referred to as "MEMS"). Although a MEMS is a very fine device with a size of 1 mm square if it is a small one, MEMSs have become more and more important in recent years as a device that is incorporated into various products to enhance the functionality and value of the products. MEMSs include non-sealed products that have a ventilation port in the surface of a package thereof. Examples of non-sealed MEMSs include various sensors that detect atmospheric pressure, humidity, gas, airflow, etc., and electroacoustic conversion elements such as speakers and microphones. Of course, the air-permeable adhesive sheet 1A can also be used for an adherend having a larger area.

The area of the air-permeable adhesive sheet 1A is, for example, 2.0 mm² to 10000 cm². The area of the air-permeable adhesive sheet 1A assumed to be used for an adherend having an attachment surface with a small area such as a MEMS (for example, air-permeable adhesive sheet 1A for a MEMS) may be 100 mm² or less, and may be 75 mm² or less, 50 mm² or less, 25 mm² or less, or even 10 mm² or less.

The thickness of the air-permeable adhesive sheet 1A is, for example, 10 to 100 μm, and may be 20 to 80 μm or even 30 to 50 μm. The air-permeable adhesive sheet 1A shown in FIG. 1A and FIG. 1B is a single-layer air-permeable adhesive sheet formed of the adhesive agent layer 2, and the thickness of the adhesive agent layer 2 is normally the same as the thickness of the air-permeable adhesive sheet 1A. The thickness of the air-permeable adhesive sheet does not include the thickness of a peeling liner described later.

The adhesive agent layer 2 is, for example, an acrylic adhesive agent layer, a silicone adhesive agent layer, a urethane adhesive agent layer, or a rubber adhesive agent layer. However, the adhesive agent layer 2 is not limited to these examples.

From the viewpoint that the through holes 3 can be more reliably formed in a production method described later, the adhesive agent layer 2 is preferably an acrylic adhesive agent layer or a silicone adhesive agent layer, and more preferably an acrylic adhesive agent layer.

An adhesive agent (adhesive agent composition) included in the adhesive agent layer 2 may be a known adhesive agent. An acrylic adhesive agent included in the acrylic adhesive agent layer is, for example, the adhesive agent disclosed in JP 2005-105212 A. A silicone adhesive agent included in the silicone adhesive agent layer is, for example, the adhesive agent disclosed in JP 2003-313516 A (including agents disclosed as comparative examples).

The adhesive agent layer 2 may include an ultraviolet absorber (hereinafter, referred to as "UVA"). The adhesive agent layer 2 including a UVA is more reliably formed in the production method described later.

The UVA that can be included in the adhesive agent layer 2 is preferably a low-molecular-weight UVA having a molecular weight of 10000 or less because it is well dispersed in the adhesive agent. The molecular weight of the UVA may be 8000 or less, 5000 or less, 3000 or less, 1500 or less, 1000 or less, or even 900 or less. The lower limit of the molecular weight of the UVA is, for example, 100 or more. In addition, the UVA can be selected from among various known UVAs such as a triazine UVA, a benzotriazole UVA, and a benzophenone UVA.

The content of the UVA in the adhesive agent layer 2 is, for example, 0.5 to 5 wt %, and may be 1 to 4 wt % or even 1.5 to 3 wt %. In these ranges, the adhesive agent layer 2 is more reliably formed in the production method described later while a decrease in the adhesive strength of the adhesive surface 4 is suppressed.

Figure 2:
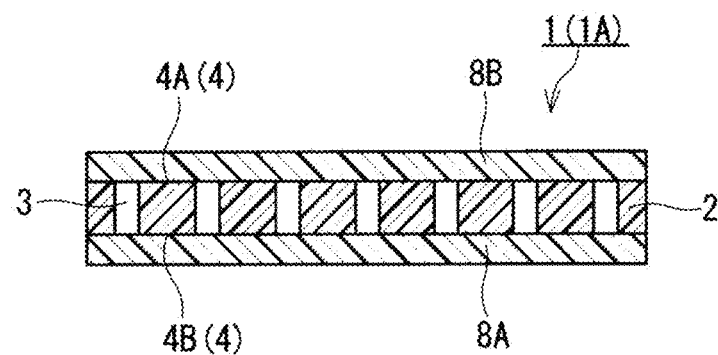
FIG. 2 is a cross-sectional view schematically showing an example of variant of the air-permeable adhesive sheet of Embodiment 1.

The air-permeable adhesive sheet 1A may further include another member and/or layer other than those described above, if necessary. The other member is, for example, a peeling liner disposed on the adhesive surface 4. The peeling liner can protect the adhesive surface 4 of the air-permeable adhesive sheet 1A. In addition, in the case where the air-permeable adhesive sheet 1A has a strip shape, it is possible to wind the air-permeable adhesive sheet 1A due to the peeling liner being disposed on each adhesive surface 4, and the air-permeable adhesive sheet 1A that is a wound body can be produced. FIG. 2 shows an example of the air-permeable adhesive sheet 1A further including peeling liners. In the air-permeable adhesive sheet 1A shown in FIG. 2, peeling liners 8A and 8B are respectively disposed on both adhesive surfaces 4 (surfaces 4A and 4B of the adhesive agent layer 2) of the air-permeable adhesive sheet 1A shown in FIG. 1A and FIG. 1B. When the air-permeable adhesive sheet 1A is used, the peeling liners 8A and 8B are normally peeled off.

Examples of the material included in the peeling liners 8A and 8B include paper, metal, resin, and composite materials thereof. Examples of the metal include stainless steel and aluminum. Examples of the resin include polyesters such as polyethylene terephthalate (PET), and polyolefins such as polyethylene (PE) and polypropylene (PP). However, the material included in the peeling liners 8A and 8B is not limited to these examples. Each of the thicknesses of the peeling liners 8A and 8B is, for example, 1 to 200 μm. The surfaces of the peeling liners 8A and 8B that are in contact with the adhesive surfaces 4 may be subjected to a release treatment that improves the releasability of the peeling liners 8A and 8B from the adhesive surfaces 4.

An example of a production method for the air-permeable adhesive sheet 1A of Embodiment 1 will be described with reference to FIG. 3A to FIG. 3D.

Figure 3A:
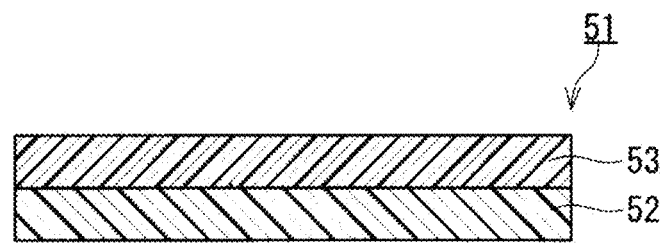
FIG. 3A is a schematic process diagram for describing a production method for the air-permeable adhesive sheet of Embodiment 1.

First, the adhesive agent composition is applied to a surface of a release sheet 52, and the applied adhesive agent composition is dried and/or cured to form a laminate 51 of a precursor layer 53 for the adhesive agent layer 2 and the release sheet 52 (FIG. 3A). Examples of the material included in the release sheet 52 include the materials exemplified as the material included in the peeling liners 8A and 8B. The resin included in the release sheet 52 may be a resin having excellent releasability, for example, a fluorine resin such as polytetrafluoroethylene (PTFE) or a polyimide resin. In addition, the material included in the release sheet 52 is not limited to these examples. The surface of the release sheet 52 on which the precursor layer 53 is to be formed may be subjected to a release treatment that improves the releasability of the adhesive agent layer 2 from the release sheet 52. The type and the thickness of the adhesive agent composition to be applied can be selected according to the adhesive agent layer 2 to be formed. Known methods can be used for applying, drying, and curing the adhesive agent composition.

Figure 3B:
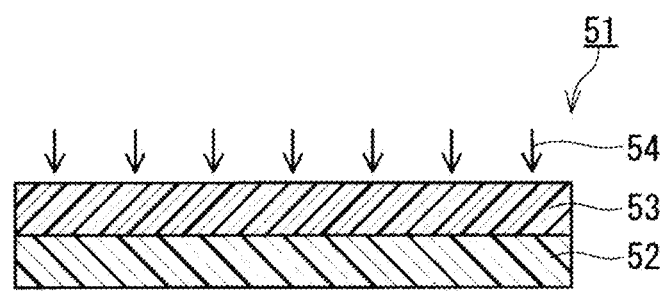
FIG. 3B is a schematic process diagram for describing the production method for the air-permeable adhesive sheet of Embodiment 1.
Figure 3C:
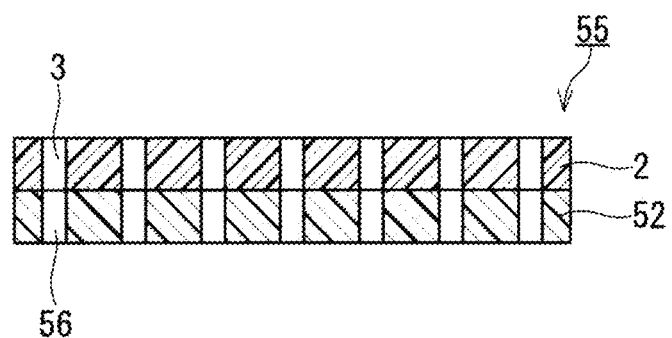
FIG. 3C is a schematic process diagram for describing the production method for the air-permeable adhesive sheet of Embodiment 1.

Next, a laser beam 54 is applied to the laminate 51 to form through holes 3 (FIG. 3B, FIG. 3C). As a result of the formation of the through holes 3, the adhesive agent layer 2 is formed from the precursor layer 53, so that a laminate 55 of the release sheet 52 and the adhesive agent layer 2 is formed. In order to form the adhesive agent layer 2 from the precursor layer 53, it is necessary to form at least through holes 3 whose average opening diameter and average interval are within the above ranges. For this reason, the laser beam 54 is preferably applied as described below.

(1) An optical system such as a galvano scanner that can accurately apply the laser beam 54 by a scanning method is selected.

(2) When the laser beam 54 is applied to the precursor layer 53, the formation of a through hole 3 due to the decomposition of molecules included in the precursor layer 53 such as adhesive agent molecules, and the formation of a denatured region (typically, a region where cross-linking of adhesive agent molecules has proceeded) due to the heat provided by the laser beam 54 proceed. Here, it should be noted that after the denatured region is formed, the denaturing does not proceed further to form a through hole 3. Rather, once the denatured region is formed, it becomes difficult to uniformly form a through hole 3 in this region. Also, the formation of a through hole 3 and the formation of a denatured region are competitive, and, therefore, the denatured region affects not only the formation of the next through hole 3 adjacent to one already-formed through hole 3, but also the formation of first one through hole 3 by application of the laser beam 54. When the denatured region expands, the opening diameters and the average interval of the through holes 3 are likely to be less uniform, and the variations in air permeability and adhesive strength are likely to increase.

In order to suppress the formation of a denatured region by application of the laser beam 54, for example:

As the wavelength of the laser beam 54, a wavelength in which the laser beam 54 is easily absorbed by the adhesive agent molecules included in the precursor layer 53 is selected. Accordingly, the formation rate of a through hole 3 can be relatively improved as compared with the formation rate of a denatured region, so that it is possible to prioritize the formation of a through hole 3. The adhesive agent molecules included in the acrylic adhesive agent and the silicone adhesive agent absorb ultraviolet light having a wavelength of 360 nm or less relatively well. Therefore, an ultraviolet laser beam can be selected as the laser beam 54. Examples of the ultraviolet laser beam include a UV-YAG laser beam (wavelength: 355 nm), a DUV-YAG laser beam (wavelength: 266 nm), and an excimer laser beam (wavelength: 248 nm).

A composition including a laser absorber is selected as the adhesive agent composition. By including the laser absorber, the formation rate of a through hole 3 can be relatively improved as compared with the formation rate of a denatured region, so that it is possible to prioritize the formation of a through hole 3. The laser absorber is, for example, a UVA. Examples of the type and the content of the UVA are as described above.

The shot time of the laser beam 54 for forming one through hole 3 is made as short as possible. This is because the formation of a denatured region proceeds when the shot time becomes longer. It is possible to further shorten the shot time of the laser beam 54 by the above selection of the wavelength of the laser beam 54 and the laser absorber. In addition, a nanosecond laser, a femtosecond laser, or the like capable of irradiation with high energy in a short shot time can be selected as the light source of the laser beam 54.

When forming a through hole 3 in the precursor layer 53 by application of the laser beam 54, a through hole 56 may be integrally formed in the release sheet 52, or the through hole 3 may be formed only in the precursor layer 53.

Figure 3D:
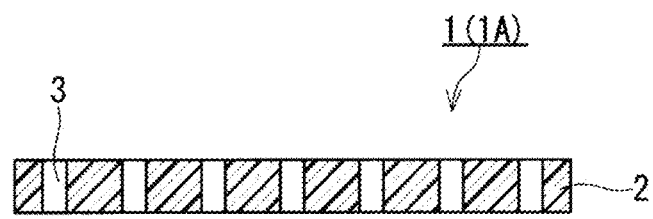
FIG. 3D is a schematic process diagram for describing the production method for the air-permeable adhesive sheet of Embodiment 1.

Next, the release sheet 52 is peeled off from the laminate 55 to obtain the air-permeable adhesive sheet 1A shown in FIG. 1A and FIG. 1B (FIG. 3D). The air-permeable adhesive sheet 1A may be distributed in the state of the laminate 55 with the release sheet 52 as a peeling liner without peeling the release sheet 52. In addition, the peeling liner 8A and/or 8B can be stacked on the adhesive surface 4A and/or 4B of the adhesive agent layer 2 obtained by peeling the release sheet 52, and the air-permeable adhesive sheet 1A can be distributed as an air-permeable adhesive sheet 1A including a peeling liner.

The air-permeable adhesive sheet 1A can be used, for example, such that the air-permeable adhesive sheet 1A is attached to an attachment surface of an adherend having breathability in the attachment surface. In other words, the air-permeable adhesive sheet 1A may be for a breathable adherend having breathability in an attachment surface thereof. In this case, it is expected that the breathability of the adherend can be ensured even after the air-permeable adhesive sheet 1A is attached to the attachment surface. The breathability of the adherend is, for example, the breathability between the attachment surface and the inside of the adherend through an opening in this surface. The opening is, for example, a ventilation port provided in the attachment surface. In this case, the adherend has breathability due to the ventilation port. Moreover, the breathability of the adherend may be the breathability of a mother structure of the adherend itself such as a porous structure. The breathable adherend is, for example, a portion obtained by excluding the air-permeable adhesive sheet of the present invention in a breathable product described later. However, the breathable adherend is not limited to those exemplified in the present description.

The air-permeable adhesive sheet 1A may be for a MEMS. The air-permeable adhesive sheet 1A for a MEMS can be used, for example, such that the air-permeable adhesive sheet 1A is attached to an attachment surface that is the surface of a package of the MEMS. The air-permeable adhesive sheet 1A may be used such that the air-permeable adhesive sheet 1A is attached to an attachment surface that is a surface, of a non-sealed MEMS, in which a ventilation port is provided. In this case, it is expected that the function of the MEMS based on ventilation through the ventilation port can be ensured even after the air-permeable adhesive sheet 1A is attached to the attachment surface.

The air-permeable adhesive sheet 1A may be used for applications where light including ultraviolet light, for example, sunlight, is not applied. However, the application of the air-permeable adhesive sheet 1A is not limited to each of the above examples. The air-permeable adhesive sheet 1A can be used for optional applications.

Embodiment 2

Figure 4A:
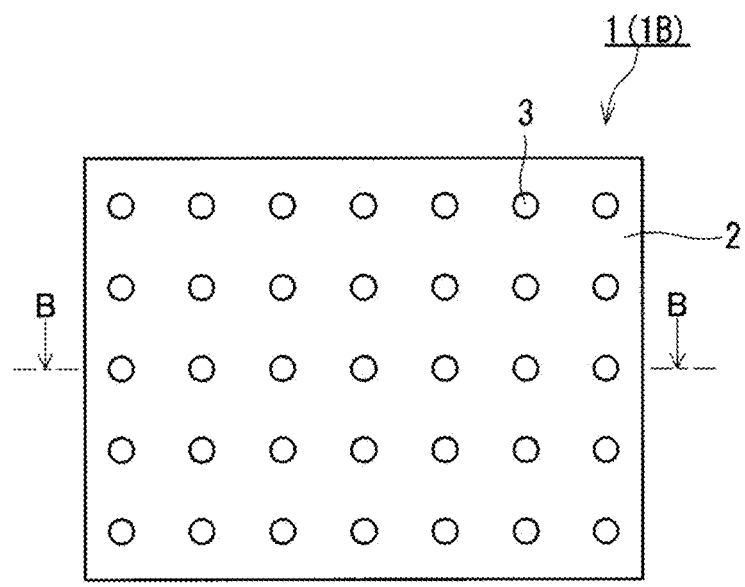
FIG. 4A is a plan view schematically showing an air-permeable adhesive sheet of Embodiment 2.
Figure 4B:
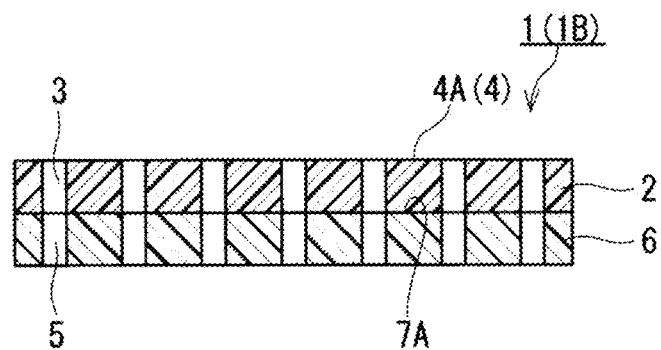
FIG. 4B is a cross-sectional view showing a cross-section B-B of the air-permeable adhesive sheet shown in FIG. 4A.

FIG. 4A and FIG. 4B show an air-permeable adhesive sheet of Embodiment 2. FIG. 4B shows a cross-section B-B of an air-permeable adhesive sheet 1 (1B) shown in FIG. 4A. The air-permeable adhesive sheet 1B is an adhesive sheet having a laminated structure of an adhesive agent layer 2 having first through holes 3 extending in a thickness direction thereof and a substrate 6 having second through holes 5 extending in a thickness direction thereof. The adhesive agent layer 2 is disposed on a surface 7A on one side of the substrate 6. The through holes 3 of the adhesive agent layer 2 and the through holes 5 of the substrate 6 communicate with each other. The air-permeable adhesive sheet 1B has air permeability in a thickness direction thereof due to the through holes 3 and the through holes 5. In addition, in the air-permeable adhesive sheet 1B, one surface 4A of the adhesive agent layer 2 forms an adhesive surface 4. The air-permeable adhesive sheet 1B is a single-sided adhesive sheet including the substrate 6.

The air-permeable adhesive sheet 1B can have the same configuration and characteristics as the air-permeable adhesive sheet 1A of Embodiment 1, except that the air-permeable adhesive sheet 1B is a single-sided adhesive sheet including the substrate 6. The adhesive agent layer 2 of the air-permeable adhesive sheet 1B can have the same configuration and characteristics as the adhesive agent layer 2 of the air-permeable adhesive sheet 1A. The description that overlaps with that of the air-permeable adhesive sheet 1A of Embodiment 1 is omitted.

In the air-permeable adhesive sheet 1B, it is sufficient that at least some of the through holes 5 of the substrate 6 communicate with the through holes 3 of the adhesive agent layer 2. With a production method described later, it is possible to produce the air-permeable adhesive sheet 1B in which all the through holes 5 of the substrate 6 communicate with the through holes 3 of the adhesive agent layer 2.

Regarding the configuration of the through holes 5, for example, at least one configuration selected from among the direction in which the through holes 5 extend, the shapes of the openings, the average opening diameter, the average interval, and the arrangement of the through holes 5, can be a corresponding configuration of the through holes 3 described above in Embodiment 1. The at least one configuration of the through holes 5 of the air-permeable adhesive sheet 1B may be the same as the corresponding configuration of the through holes 3, and such an air-permeable adhesive sheet 1B can be produced by the production method described later.

Examples of the material included in the substrate 6 include paper, metal, resin, and composite materials thereof. Examples of the resin include polyolefin resins such as PE and PP, polyester resins such as PET, polyimide resins, and fluorine resins such as PTFE. However, the material included in the substrate 6 is not limited to these examples.

The thickness of the substrate 6 is, for example, 1 to 100 µm, and may be 5 to 80 µm or even 10 to 30 µm. In addition, the thickness of the adhesive agent layer 2 in the air-permeable adhesive sheet 1B is, for example, 1 to 100 µm, and may be 5 to 80 µm or even 10 to 30 µm.

The shape of the substrate 6 is normally the same as that of the air-permeable adhesive sheet 1B. It is sufficient that the adhesive agent layer 2 is disposed on at least a part of the surface 7A of the substrate 6. In the example shown in FIG. 4A and FIG. 4B, the adhesive agent layer 2 is disposed on the entirety of the surface 7A of the substrate 6.

The applications for which the air-permeable adhesive sheet 1B can be used are the same as the applications described above for the air-permeable adhesive sheet 1A.

An example of a production method for the air-permeable adhesive sheet 1B of Embodiment 2 will be described with reference to FIG. 5A to FIG. 5C.

Figure 5A:
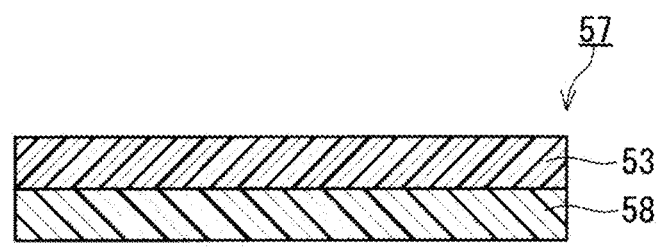
FIG. 5A is a schematic process diagram for describing a production method for the air-permeable adhesive sheet of Embodiment 2.

First, an adhesive composition is applied to one surface of an original sheet 58, and the applied adhesive agent composition is dried and/or cured to form a laminate 57 of a precursor layer 53 for the adhesive agent layer 2 and the original sheet 58 (FIG. 5A). As the original sheet 58, a sheet having the same configuration as the substrate 6 except that the sheet does not have through holes 5 can be normally selected. The type and the thickness of the adhesive agent composition to be applied can be selected according to the adhesive agent layer 2 to be formed. Known methods can be used for applying, drying, and curing the adhesive agent composition.

Figure 5B:
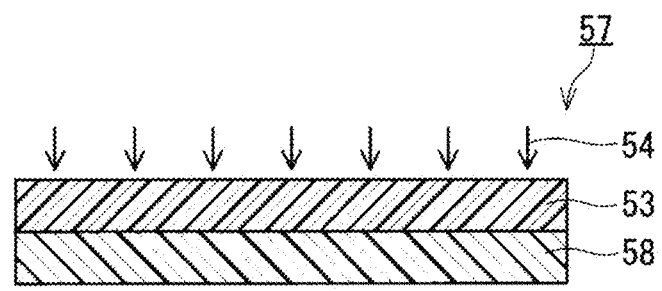
FIG. 5B is a schematic process diagram for describing the production method for the air-permeable adhesive sheet of Embodiment 2.
Figure 5C:
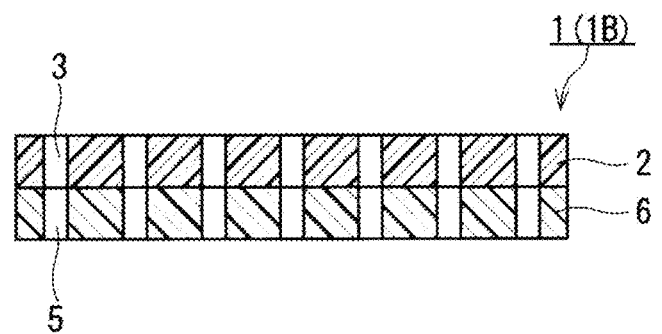
FIG. 5C is a schematic process diagram for describing the production method for the air-permeable adhesive sheet of Embodiment 2.

Next, a laser beam 54 is applied to the laminate 57 to form through holes 3 and 5 (FIG. 5B, FIG. 5C). The adhesive agent layer 2 is formed from the precursor layer 53 as a result of the formation of the through holes 3, and the substrate 6 is formed from the original sheet 58 as a result of the formation of the through holes 5, so that the air-permeable adhesive sheet 1B having a laminated structure of the substrate 6 and the adhesive agent layer 2 is obtained. In order to form the adhesive agent layer 2 from the precursor layer 53, it is necessary to form at least through holes 3 whose average opening diameter and average interval are within the above ranges. For this reason, the application of the laser beam 54 described above for the method for producing the air-permeable adhesive sheet 1A is preferably performed. In addition, the application of the laser beam 54 to the laminate 57 is preferably performed from the precursor layer 53 side, so that through holes 3 whose average opening diameter and average interval are within the above-described ranges can be more reliably formed.

Embodiment 3

Figure 6A:
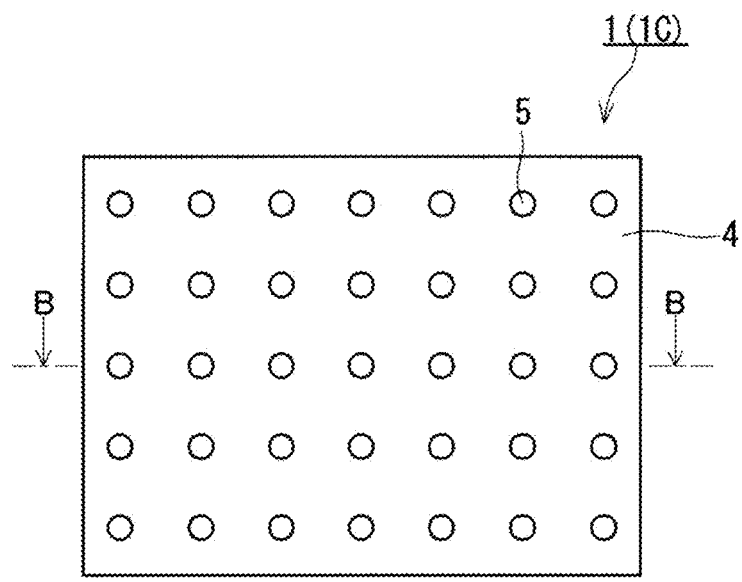
FIG. 6A is a plan view schematically showing an air-permeable adhesive sheet of Embodiment 3.
Figure 6B:
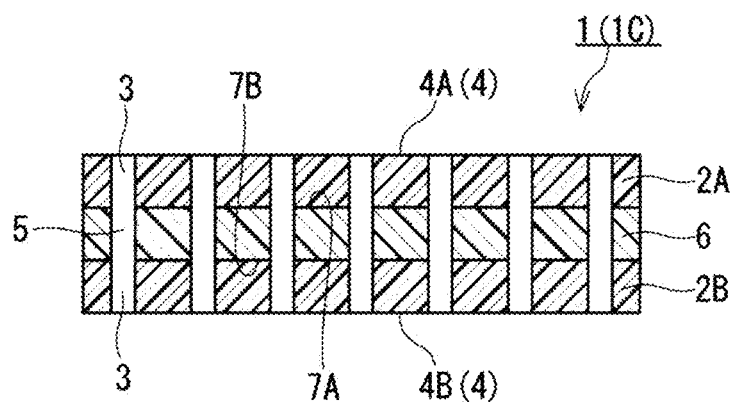
FIG. 6B is a cross-sectional view showing a cross-section B-B of the air-permeable adhesive sheet shown in FIG. 6A.

FIG. 6A and FIG. 6B show an air-permeable adhesive sheet of Embodiment 3. FIG. 6B shows a cross-section B-B of an air-permeable adhesive sheet 1 (1C) shown in FIG. 6A. The air-permeable adhesive sheet 1C is an adhesive sheet having a laminated structure of two adhesive agent layers 2 (2A, 2B) having first through holes 3 extending in a thickness direction thereof and a substrate 6 having second through holes 5 extending in a thickness direction thereof. The adhesive agent layers 2A and 2B are disposed on surfaces 7A and 7B on both sides of the substrate 6, respectively. The through holes 3 of the adhesive agent layer 2A and the through holes 5 of the substrate 6 communicate with each other. In addition, the through holes 5 of the substrate 6 and the through holes 3 of the adhesive agent layer 2B communicate with each other. The air-permeable adhesive sheet 1C has air permeability in a thickness direction thereof due to the through holes 3 and the through holes 5. In the air-permeable adhesive sheet 1C, each of one surface 4A of the adhesive agent layer 2A and one surface 4B of the adhesive agent layer 2B forms an adhesive surface 4. The air-permeable adhesive sheet 1C is a doubled-sided adhesive sheet including the substrate 6.

The air-permeable adhesive sheet 1C can have the same configuration and characteristics as the air-permeable adhesive sheet 1A of Embodiment 1, except that the air-permeable adhesive sheet 1C is a doubled-sided adhesive sheet including the substrate 6. The adhesive agent layers 2A and 2B and the substrate 6 of the air-permeable adhesive sheet 1C can have the same configuration and characteristics as the adhesive agent layer 2 of the air-permeable adhesive sheet 1A and the substrate 6 of the air-permeable adhesive sheet 1B of Embodiment 2. The description that overlaps with that of Embodiments 1 and 2 is omitted.

In the air-permeable adhesive sheet 1C, it is sufficient that at least some of the through holes 5 of the substrate 6 communicate with the through holes 3 of the adhesive agent layers 2A and 2B. With a production method described later, it is possible to produce the air-permeable adhesive sheet 1C in which all the through holes 5 of the substrate 6 communicate with the through holes 3 of the adhesive agent layers 2A and 2B.

In the air-permeable adhesive sheet 1C, the through holes 3 of the adhesive agent layer 2A and the through holes 3 of the adhesive agent layer 2B may have the same configuration, and may be the same, for example, for at least one configuration selected from the direction in which the through holes 3 extend, and the shapes of the openings, the average opening diameter, the average interval, and the arrangement of the through holes 3, and such an air-permeable adhesive sheet 1C can be produced by the production method described later.

In the air-permeable adhesive sheet 1C, the adhesive agent included in the adhesive agent layer 2A and the adhesive agent included in the adhesive agent layer 2B may be the same or may be different from each other.

The shape of the substrate 6 is normally the same as that of the air-permeable adhesive sheet 1C. It is sufficient that the adhesive agent layers 2A and 2B are disposed on at least parts of the surfaces 7A and 7B of the substrate 6, respectively. In the example shown in FIG. 6A and FIG. 6B, the adhesive agent layers 2A and 2B are disposed on the entireties of the surfaces 7A and 7B of the substrate 6, respectively.

The applications for which the air-permeable adhesive sheet 1C can be used are the same as the applications described above for the air-permeable adhesive sheet 1A.

An example of a production method for the air-permeable adhesive sheet 1C of Embodiment 3 will be described with reference to FIG. 7A to FIG. 7C.

Figure 7A:
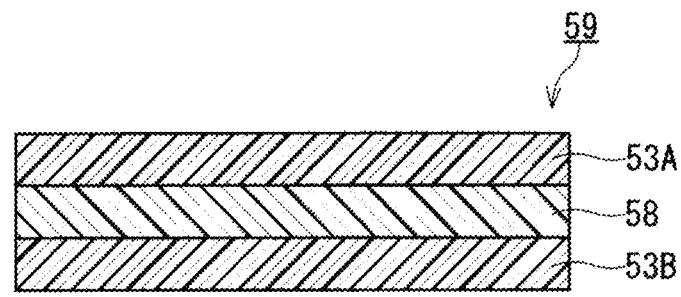
FIG. 7A is a schematic process diagram for describing a production method of the air-permeable adhesive sheet of Embodiment 3.

First, an adhesive agent composition is applied to both surfaces of an original sheet 58, and the applied adhesive agent composition is dried and/or cured to form a laminate 59 of a precursor layer 53A for the adhesive agent layer 2A, the original sheet 58, and a precursor layer 53B for the adhesive agent layer 2B (FIG. 7A). As the original sheet 58, a sheet having the same configuration as the substrate 6 except that the sheet does not have through holes 5 can be normally selected. The type and the thickness of the adhesive agent composition to be applied can be selected according to the adhesive agent layers 2A and 2B to be formed. Known methods can be used for applying, drying, and curing the adhesive agent composition.

Figure 7B:
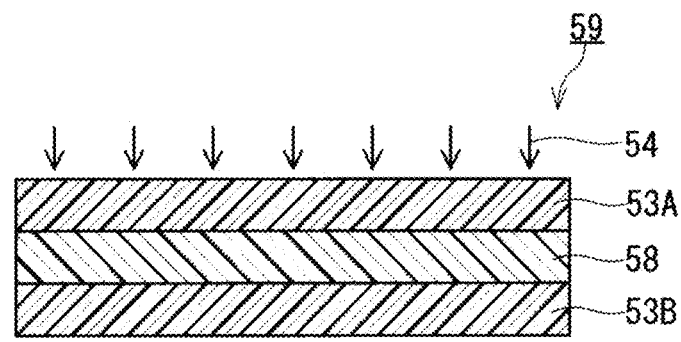
FIG. 7B is a schematic process diagram for describing the production method for the air-permeable adhesive sheet of Embodiment 3.
Figure 7C:
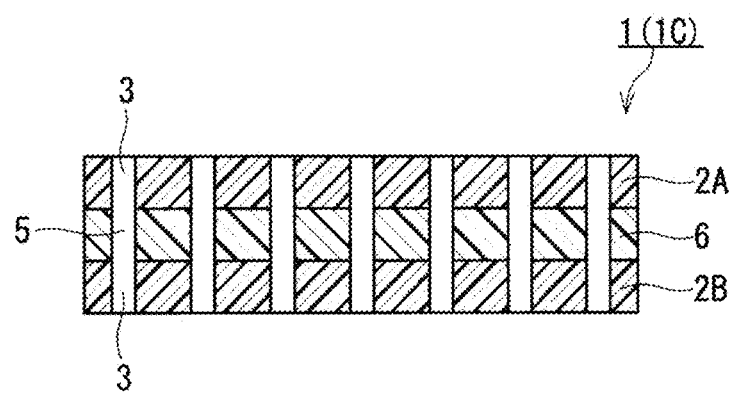
FIG. 7C is a schematic process diagram for describing the production method for the air-permeable adhesive sheet of Embodiment 3.

Next, a laser beam 54 is applied to the laminate 59 to form through holes 3 and 5 (FIG. 7B, FIG. 7C). The adhesive agent layers 2A and 2B are formed from the precursor layers 53A and 53B as a result of the formation of the through holes 3, and the substrate 6 is formed from the original sheet 58 as a result of the formation of the through holes 5, so that the air-permeable adhesive sheet 1C having a laminated structure of the adhesive agent layer 2A, the substrate 6, and the adhesive agent layer 2B is obtained. In order to form the adhesive agent layers 2A and 2B from the precursor layers 53A and 53B, it is necessary to form at least through holes 3 whose average opening diameter and average interval are within the above ranges. For this reason, the application of the laser beam 54 described above for the method for producing the air-permeable adhesive sheet 1A is preferably performed.

The application of the laser beam 54 to the laminate 59 can be performed from any side of the precursor layer 53A side and the precursor layer 53B side, but the precursor layer located on the side on which the laser beam 54 is applied preferably includes a laser absorber, for example, a UVA. Depending on the material included in the original sheet 58, for example, in the case where the material included in the original sheet 58 is polyimide as a more specific example, the action of the laser beam 54 on the original sheet 58 is stronger than that on the precursor layer 53, so that the decomposition of the original sheet 58 may proceed more strongly than the formation of a through hole 3 by the laser beam 54. When the decomposition of the original sheet 58 proceeds more strongly than the formation of a through hole 3, the decomposition material of the original sheet 58 is deposited inside the laminate 59, resulting in non-uniform formation of a through hole 5. In an extreme case, carbonization of the original sheet 58 may proceed without forming a through hole 5, so that the air-permeable adhesive sheet 1C cannot be obtained. When the precursor layer 53 located on the side on which the laser beam 54 is applied includes a laser absorber, the decomposition of the precursor layer 53 can be caused to proceed more strongly than the decomposition of the original sheet 58 to rapidly form a through hole 3, thereby preventing non-uniform formation of a through hole 5 and/or carbonization of the original sheet 58. Both of the precursor layers 53A and 53B may include a laser absorber. In the above production method, either one of or both the adhesive agent layer 2A and the adhesive agent layer 2B can include a laser absorber.

[Breathable Product]

Figure 8A:
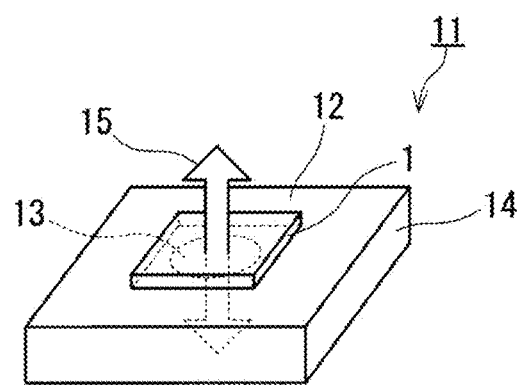
FIG. 8A is a perspective view schematically showing an example of the breathable product of the present invention.

FIG. 8A shows an example of the breathable product of the present invention. A breathable product 11 shown in FIG. 8A includes a housing 14 having a ventilation port 13. The ventilation port 13 is an opening provided in a surface 12 of the housing 14. The breathable product 11 further includes the air-permeable adhesive sheet 1 of the present invention. The air-permeable adhesive sheet 1 is attached and joined to the surface 12 so as to cover the ventilation port 13. In the breathable product 11, ventilation 15 can be ensured through the ventilation port 13 and the air-permeable adhesive sheet 1. In the breathable product 11, even when the areas of the surface 12 and the air-permeable adhesive sheet 1 are small, good characteristics such as ventilation ability based on the air-permeable adhesive sheet 1 can be obtained. In the example shown in FIG. 8A, one ventilation port 13 is provided in the surface 12, and no opening other than the ventilation port 13 is provided. However, the number of ventilation ports 13 provided in the surface 12 is not limited.

The area of the surface 12 is, for example, 2.0 mm$^2$ to 10000 mm$^2$. The area of the surface 12 may be 100 mm$^2$ or less, and may be 75 mm$^2$ or less, 50 mm$^2$ or less, 25 mm$^2$ or less, or even 10 mm$^2$ or less.

The ratio of the area of the air-permeable adhesive sheet 1 to the area of the surface 12 is, for example, 0.01 to 90%, and may be 0.1 to 70% or even 1 to 50%.

The breathable product 11 is, for example, a non-sealed MEMS. Examples of the non-sealed MEMS are as described above. However, the breathable product 11 is not limited to this example.

Figure 8B:
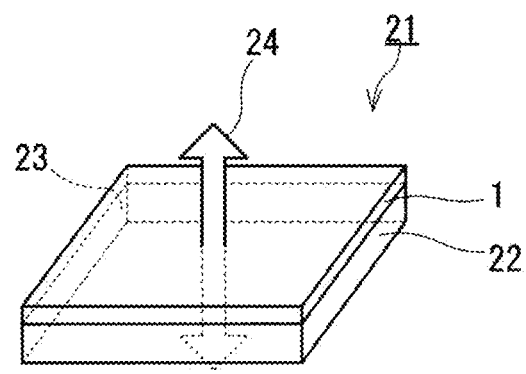
FIG. 8B is a perspective view schematically showing another example of the breathable product of the present invention.
Figure 9:
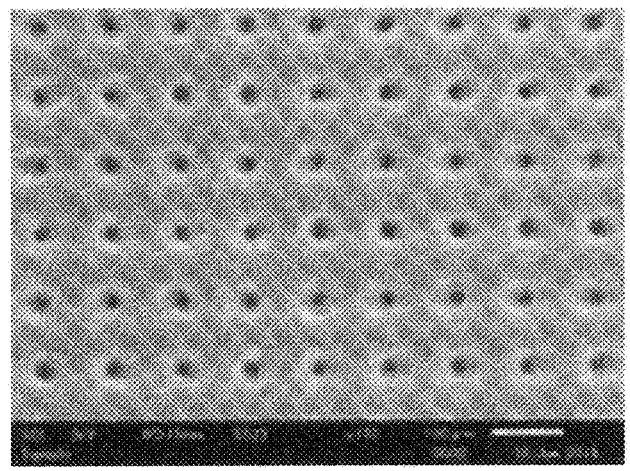
FIG. 9 shows an observation image (SEM observation image) obtained by observing an adhesive surface of an air-permeable adhesive sheet produced in Example 1 by a scanning electron microscope (hereinafter, referred to as "SEM").
Figure 10:
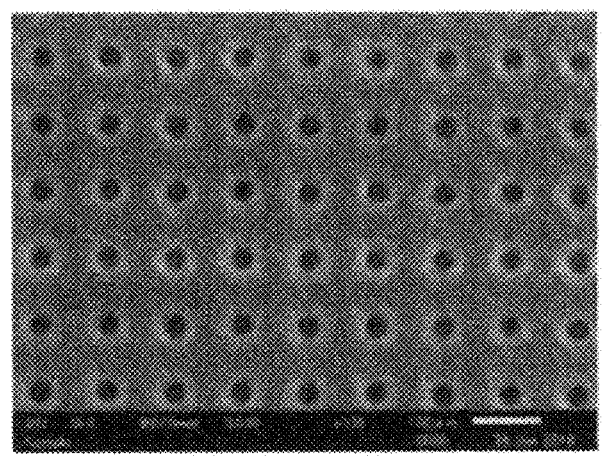
FIG. 10 shows an SEM observation image of an adhesive surface of an air-permeable adhesive sheet produced in Example 2.
Figure 11:
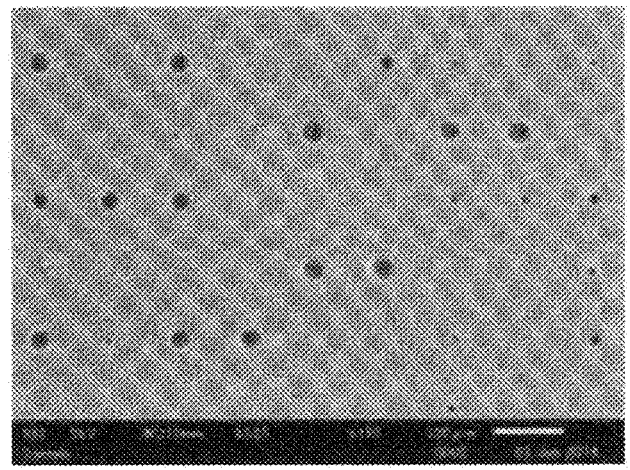
FIG. 11 shows an SEM observation image of an adhesive surface of an air-permeable adhesive sheet produced in Comparative Example 1.
Figure 12:
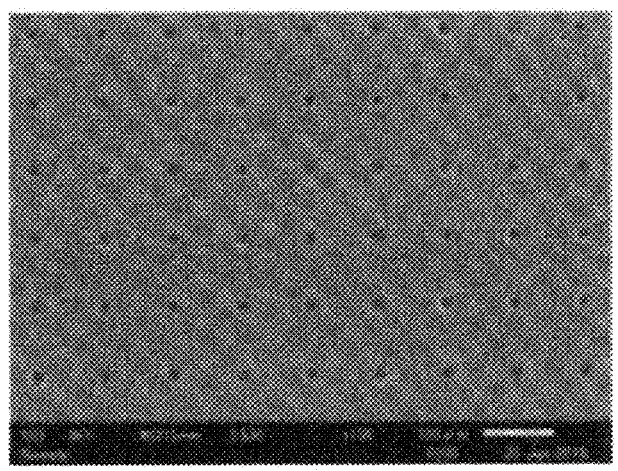
FIG. 12 shows an SEM observation image of an adhesive surface of an air-permeable adhesive sheet produced in Comparative Example 2.
Figure 13:
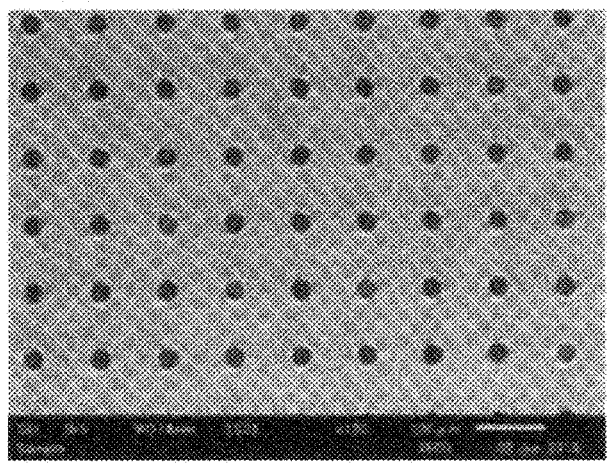
FIG. 13 shows an SEM observation image of an adhesive surface of an air-permeable adhesive sheet produced in Example 3.
Figure 14:
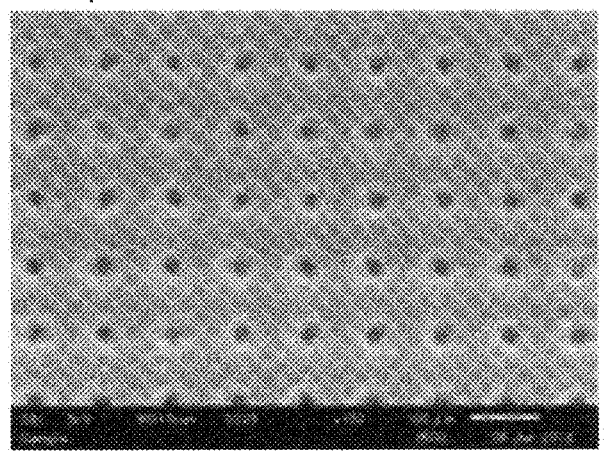
FIG. 14 shows an SEM observation image of an adhesive surface of an air-permeable adhesive sheet produced in Example 4.
Figure 15:
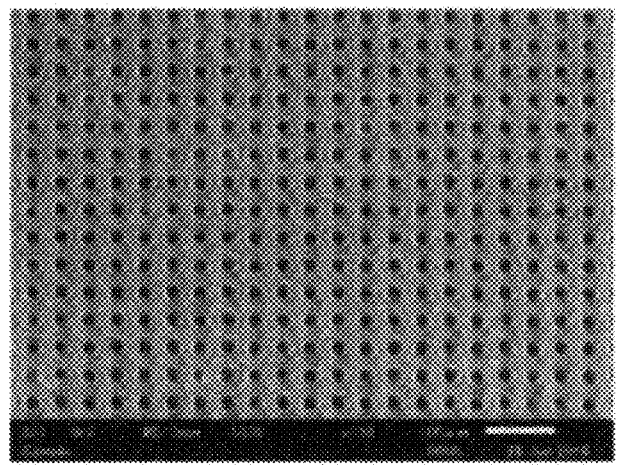
FIG. 15 shows an SEM observation image of an adhesive surface of an air-permeable adhesive sheet produced in Example 5.
Figure 16:
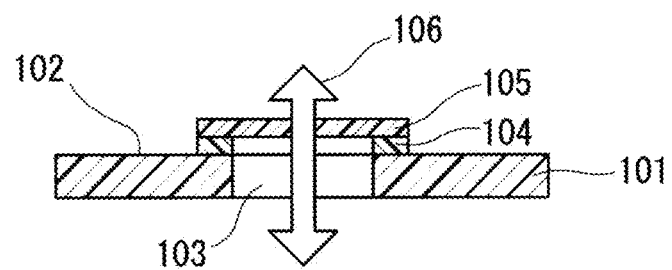
FIG. 16 is a cross-sectional view schematically showing the vicinity of a ventilation port in an example of a conventional ventilation housing.

FIG. 8B shows another example of the breathable product of the present invention. A breathable product 21 shown in FIG. 8B includes a porous substrate 22 and the air-permeable adhesive sheet 1 of the present invention attached to a surface 23 of the porous substrate 22. The air-permeable adhesive sheet 1 is attached and joined to the surface 23 so as to cover the entirety of the surface 23. It should be noted that it is sufficient that the air-permeable adhesive sheet 1 is attached to the surface 23 so as to cover at least a part of the surface 23. The porous substrate 22 has air permeability based on a porous structure that is the mother structure of the substrate 22 (air permeability through the surface 23). In the breathable product 21, ventilation 24 can be ensured through the porous substrate 22 and the air-permeable adhesive sheet 1. In the breathable product 21, even when the areas of the surface 23 and the air-permeable adhesive sheet 1 are small, good characteristics such as air permeability based on the air-permeable adhesive sheet 1 can be obtained.

The area of the surface 23 is, for example, 2.0 mm$^2$ to 10000 mm$^2$. The area of the surface 23 may be 100 mm$^2$ or less, and may be 75 mm$^2$ or less, 50 mm$^2$ or less, 25 mm$^2$ or less, or even 10 mm$^2$ or less.

The ratio of the area of the air-permeable adhesive sheet 1 to the area of the surface 23 is, for example, 1.0 to 100%.

The lower limit of the ratio may be 5.0% or more or even 10% or more. The upper limit of the ratio may be 99% or less, 98% or less, or even 95% or less.

Examples of the porous substrate 22 include: stretched porous sheets such as a porous PTFE sheet; porous sheets in which resin particles are bound to each other such as a sheet in which ultra-high-molecular-weight polyethylene (UHMWPE) particles are bound to each other; fiber substrates such as a non-woven fabric and a woven fabric; and porous sheets formed from metal and/or resin such as an expanded sheet, a punched sheet, a mesh, and a net. The porous substrate 22 that is a stretched porous sheet, a bound sheet, or a fiber substrate normally has micropores communicating with each other over the entity thereof, and has air permeability based on the micropores. In addition, the pores in the porous sheet normally connect the surface 23 and the other surface of the porous substrate 22, and are, for example, through holes extending in a direction perpendicular to the surface 23.

Examples of the breathable product 21 include an air-permeable member and a sound-transmitting member used in information devices, portable devices, electronic devices, and electric products such as a smartphone, a tablet PC, and an electric shaver. In this case, the porous substrate 22 may be an air-permeable membrane or a sound-transmitting membrane. The air-permeable member and the sound-transmitting member may be waterproof. However, the breathable product 21 is not limited to these examples.

EXAMPLES

Hereinafter, the present invention will be described more specifically by way of Examples. The present invention is not limited to the following Examples.

First, methods for evaluating the characteristics of air-permeable adhesive sheets produced in the Examples will be described.

[Average Opening Diameter and Variation in Opening Diameters of Through Holes in Adhesive Agent Layer]

The average opening diameter of the through holes in an adhesive agent layer was evaluated by image analysis of an observation image by an SEM on a surface (adhesive surface) of the adhesive agent layer to be evaluated. In evaluating the average opening diameter and the variation in the opening diameters, the openings of three through holes existing in the adhesive surface were randomly extracted.

[Average Interval of Through Holes in Adhesive Agent Layer]

The average interval of the through holes in an adhesive agent layer was evaluated by image analysis of an observation image by an SEM on a surface (adhesive surface) of the adhesive agent layer to be evaluated. In evaluating the average interval, the openings of six through holes existing in the adhesive surface were randomly extracted.

[Air Permeability in Thickness Direction]

The air permeability (Gurley air permeability) in the thickness direction of an air-permeable adhesive sheet was evaluated according to the above-described method conforming to Method B for air permeability measurement (Gurley method) specified in JIS L 1096: 2010, with an effective measurement area being set to 2.0 mm$^2$.

[Variation in Air Permeability in Thickness Direction]

The variation in the air permeability in the thickness direction of an air-permeable adhesive sheet was evaluated as a coefficient of variation of Gurley air permeability on the basis of the standard deviation and the average value of Gurley air permeability obtained by the above-described method conforming to Method B for air permeability measurement (Gurley method) specified in JIS L 1096: 2010, with an effective measurement area being set to 2.0 mm². In order to obtain the standard deviation and the average value of Gurley air permeability, measurement regions at three locations were set in the air-permeable adhesive sheet to be evaluated.

[Adhesive Strength of Adhesive Surface]

The adhesive strength (180° peeling adhesive strength) of the adhesive surface of an air-permeable adhesive sheet was evaluated according to Testing Method 1 for adhesive strength specified in JIS Z0237: 2009.

[Variation in Adhesive Strength of Adhesive Surface]

The variation in the adhesive strength of the adhesive surface of an air-permeable adhesive sheet was evaluated as a coefficient of variation of 180° peeling adhesive strength on the basis of the standard deviation and the average value of 180° peeling adhesive strength obtained according to Testing Method 1 for adhesive strength specified in JIS Z0237: 2009. In order to obtain the standard deviation and the average value of 180° peeling adhesive strength, measurement regions at three locations were set in the air-permeable adhesive sheet to be evaluated.

Example 1

In Example 1, a single-layer air-permeable adhesive sheet formed of an adhesive agent layer having through holes extending in a thickness direction thereof was produced by the production method shown in FIG. 3A to FIG. 3D.

First, an acrylic adhesive agent composition was applied to a surface of a PET sheet, and the applied adhesive agent composition was dried to form a laminate of a precursor layer (thickness: 20 µm) and the PET sheet. As the adhesive agent composition, a composition obtained by adding 2 parts by weight of a UVA (Tinuvin 326, manufactured by BASF) to 100 parts by weight of the composition disclosed in JP 2005-105212 A was selected. A die coater was used for applying the adhesive agent composition to the surface of the PET sheet. The drying conditions of the applied adhesive agent composition were set to 100° C. and 10 minutes.

Next, an adhesive agent layer having through holes extending in a thickness direction thereof was formed from the precursor layer by applying a laser beam to the formed laminate from the precursor layer side. For the laser beam, a UV-YAG laser (Talon, manufactured by Spectra-Physics), which is a pulsed ultraviolet light laser, was selected. In addition, the application of the laser beam was performed by a scanning method using a galvano scanner, and the laser beam was applied such that the center of the opening of each through hole formed was located at a position corresponding to an intersection of a square lattice when viewed in a direction perpendicular to an adhesive surface and such that the average interval of the through holes was 100 µm. The shot time of the laser beam for forming one through hole was set to 20 nanoseconds. When forming a through hole in the precursor layer, a through hole was also integrally formed in the PET sheet.

Next, the formed adhesive agent layer was peeled off from the PET sheet to obtain an air-permeable adhesive sheet of Example 1. The average opening diameter, the variation in the opening diameters, and the average interval of the through holes in the formed adhesive agent layer and the adhesive strength and the variation in the adhesive strength of the adhesive surface of the air-permeable adhesive sheet were evaluated without peeling the adhesive agent layer from the PET sheet. The air permeability in the thickness direction and the variation in the air permeability in the thickness direction of the air-permeable adhesive sheet were evaluated in a state where the adhesive agent layer was peeled off from the PET sheet.

Example 2

In Example 2, a single-layer air-permeable adhesive sheet formed of an adhesive agent layer having through holes extending in a thickness direction thereof was produced in the same manner as Example 1, except that the thickness of the precursor layer formed on the surface of the PET sheet was 60 µm.

Comparative Example 1

In Comparative Example 1, a single-layer air-permeable adhesive sheet formed of an adhesive agent layer having through holes extending in a thickness direction thereof was produced in the same manner as Example 1, except that the UVA was not added to the adhesive agent composition.

Comparative Example 2

In Comparative Example 2, a single-layer air-permeable adhesive sheet formed of an adhesive agent layer having through holes extending in a thickness direction thereof was produced in the same manner as Example 1, except that the thickness of the precursor layer formed on the surface of the PET sheet was 10 µm and the UVA was not added to the adhesive agent composition.

Example 3

In Example 3, an air-permeable adhesive sheet that has a laminated structure of an adhesive agent layer having through holes extending in a thickness direction thereof and a substrate having through holes extending in a thickness direction thereof and in which the adhesive agent layer is disposed on a surface on one side of the substrate was produced by the production method shown in FIG. 5A to FIG. 5C.

First, an acrylic adhesive agent composition was applied to one surface of a polyimide sheet (thickness: 12 µm), which is an original sheet, and the applied adhesive agent composition was dried to form a laminate of a precursor layer (thickness: 20 µm) and the polyimide sheet. As the adhesive agent composition, a composition including the UVA used in Example 1 was used. In addition, a die coater was used for applying the adhesive agent composition to the surface of the polyimide sheet. The drying conditions of the applied adhesive agent composition were the same as those in Example 1.

Next, by applying a laser beam to the formed laminate from the precursor layer side, through holes were integrally formed in the precursor layer and the original film to obtain an air-permeable adhesive sheet of Example 3 having a laminated structure (two-layer structure) of an adhesive agent layer having through holes extending in a thickness direction thereof and a substrate having through holes that communicate with the through holes of the adhesive agent layer and extend in a thickness direction of the substrate. The type of the laser beam applied and the application conditions of the laser beam were the same as those in Example 1.

Example 4

In Example 4, an air-permeable adhesive sheet that has a laminated structure of adhesive agent layers having through holes extending in a thickness direction thereof and a substrate having through holes extending in a thickness direction thereof and in which the adhesive agent layers are disposed on surfaces on both sides of the substrate was produced by the production method shown in FIG. 7A to FIG. 7C.

First, an acrylic adhesive agent composition was applied to both surfaces of a polyimide sheet (thickness: 12 μm), which is an original sheet, and the applied adhesive agent composition was dried to form a laminate of a precursor layer (thickness: 20 μm), the polyimide sheet, and a precursor layer (thickness: 20 μm). As the adhesive agent composition, a composition including the UVA used in Example 1 was used. In addition, a die coater was used for applying the adhesive agent composition to the surfaces of the polyimide sheet. The drying conditions of the applied adhesive agent composition were the same as those in Example 1.

Next, by applying a laser beam to the formed laminate from one precursor layer side, through holes were integrally formed in the precursor layers and the original film to obtain an air-permeable adhesive sheet of Example 4 having a laminated structure (three-layer structure) of adhesive agent layers having through holes in a thickness direction thereof and a substrate having through holes that communicate with the through holes of the adhesive agent layers and extend in a thickness direction thereof. The type of the laser beam applied and the application conditions of the laser beam were the same as those in Example 1.

Example 5

In Example 5, an air-permeable adhesive sheet that has a two-layer structure as a laminated structure of an adhesive agent layer having through holes extending in a thickness direction thereof and a substrate having through holes extending in a thickness direction thereof and in which the adhesive agent layer is disposed on a surface on one side of the substrate was produced in the same manner as Example 3, except that the laser beam was applied such that the average interval of the through holes was 40 μm.

Comparative Example 3

In Comparative Example 3, production of an air-permeable adhesive sheet that has a laminated structure of adhesive agent layers having through holes extending in a thickness direction thereof and a substrate having through holes extending in a thickness direction thereof and in which the adhesive agent layers are disposed on surfaces on both sides of the substrate, was attempted in the same manner as Example 4, except that the UVA was not applied to the adhesive agent composition. However, by application of the laser beam, carbonization of the original film proceeded before through holes were formed in the precursor layers, so that an air-permeable adhesive sheet was not able to be produced.

Tables 1A and 1B below show the evaluation results of the characteristics of the air-permeable adhesive sheets produced in Examples 1 to 5 and Comparative Examples 1 and 2. In addition, FIGS. 9 to 15 show observation images by an SEM of the adhesive surfaces of the air-permeable adhesive sheets produced in Examples 1 to 5 and Comparative Examples 1 and 2.

TABLE 1A

|  | Example 1 | Example 2 | Comparative Example 1 | Comparative Example 2 |
| --- | --- | --- | --- | --- |
| Number of layers | Single layer | Single layer | Single layer | Single layer |
| Average opening diameter of through holes (μm) | 30.2 | 28.5 | 18.2 | 22.7 |
| Variation in opening diameters of through holes (%) | 6.97 | 6.56 | 58.6 | 9.76 |
| Average interval of through holes (μm) | 100 | 100 | 100 | 100 |
| Air permeability in thickness direction (seconds/100 mL) | 26.5 | 10 | 62 | 32 |
| Variation in air permeability in thickness direction (%) | 18.7 | 5.72 | 41.7 | 23.4 |
| Adhesive strength of adhesive surface (N/10 mm) | 4.04 | 7.25 | 0.156 | 0.513 |
| Variation in adhesive strength of adhesive surface (%) | 5.60 | 6.78 | 36.7 | 13.8 |

TABLE 1B

|  | Example 3 | Example 4 | Example 5 |
| --- | --- | --- | --- |
| Number of layers | Two layers | Three layers | Two layers |
| Average opening diameter of through holes (μm) | 27.7 | 21.4 | 18.4 |
| Variation in opening diameters of through holes (%) | 2.98 | 1.62 | 3.55 |
| Average interval of through holes (μm) | 100 | 100 | 40 |
| Air permeability in thickness direction (seconds/100 mL) | 38 | 93 | 8.6 |
| Variation in air permeability in thickness direction (%) | 14.6 | 12.0 | 12.5 |
| Adhesive strength of adhesive surface (N/10 mm) | 4.68 | 7.92 | 2.01 |
| Variation in adhesive strength of adhesive surface (%) | 2.24 | 5.69 | 3.34 |

INDUSTRIAL APPLICABILITY

The air-permeable adhesive sheet of the present invention can be used, for example, such that the air-permeable adhesive sheet is attached to a surface of an adherend having breathability in the surface. With the air-permeable adhesive sheet of the present invention, it is expected that the breathability of the adherend can be ensured even after the air-permeable adhesive sheet is attached to the surface.

The invention claimed is:
1. An air-permeable adhesive sheet having air permeability in a thickness direction thereof, the air-permeable adhesive sheet comprising:
 an adhesive agent layer having first through holes extending in the thickness direction, wherein
 at least one surface of the adhesive agent layer forms an adhesive surface,
 the through holes have an average opening diameter of 1.0 to 50 μm,
 the through holes have an average interval of 5 to 400 μm, and
 a variation in air permeability in the thickness direction is 22% or less as represented by a coefficient of variation of an air permeability measured according to Method B for air permeability measurement (Gurley method)

specified in JIS L 1096: 2010, with an effective measurement area as a predetermined value selected from 0.5 to 2.0 mm$^2$.

2. The air-permeable adhesive sheet according to claim 1, wherein the air-permeable adhesive sheet is a doubled-sided adhesive sheet that is unprovided with a substrate and in which each of both surfaces of the adhesive agent layer forms an adhesive surface.

3. The air-permeable adhesive sheet according to claim 1, further comprising a substrate having second through holes extending in the thickness direction, wherein
  the adhesive agent layer is disposed on a surface on one side of the substrate or on surfaces on both sides of the substrate, and
  the first through holes and the second through holes communicate with each other.

4. The air-permeable adhesive sheet according to claim 3, wherein the substrate includes polyethylene terephthalate or polyimide.

5. The air-permeable adhesive sheet according to claim 1, wherein a peeling liner is disposed on the adhesive surface.

6. The air-permeable adhesive sheet according to claim 1, wherein the air-permeable adhesive sheet has an area of 100 mm$^2$ or less.

7. The air-permeable adhesive sheet according to claim 1, wherein the air-permeable adhesive sheet has a thickness of 10 to 100 µm.

8. The air-permeable adhesive sheet according to claim 1, wherein the adhesive agent layer includes an ultraviolet absorber.

9. The air-permeable adhesive sheet according to claim 1, wherein the adhesive agent layer is an acrylic adhesive agent layer or a silicone adhesive agent layer.

10. The air-permeable adhesive sheet according to claim 1, wherein the air-permeable adhesive sheet is for a breathable adherend having breathability in an attachment surface to which the air-permeable adhesive sheet is to be attached.

11. The air-permeable adhesive sheet according to claim 1, wherein the air-permeable adhesive sheet is for a micro electro mechanical system (MEMS).

12. A breathable product having a surface with an opening and having breathability through the opening in the surface, the breathable product further comprising:
  an air-permeable adhesive sheet attached to the surface so as to cover the opening, wherein
  the air-permeable adhesive sheet is the air-permeable adhesive sheet according to claim 1.

13. A breathable product comprising a porous substrate and an air-permeable adhesive sheet attached to a surface of the porous substrate, wherein
  the air-permeable adhesive sheet is the air-permeable adhesive sheet according to claim 1.

* * * * *